(12) United States Patent
Christensen et al.

(10) Patent No.: US 7,571,197 B2
(45) Date of Patent: Aug. 4, 2009

(54) METHOD AND APPARATUS FOR SYNCHRONIZING DATASET OBJECT PROPERTIES WITH UNDERLYING DATABASE STRUCTURES

(75) Inventors: Barbara A. Christensen, Lino Lakes, MN (US); Michael J. Hill, Vadnais Heights, MN (US); Kenneth L. Reising, West St. Paul, MN (US); John C. Horton, St. Paul, MN (US); Eugene J. Gretter, Lino Lakes, MN (US)

(73) Assignee: Unisys Corporation, Blue Bell, PA (US)

( * ) Notice: Subject to any disclaimer, the term of this patent is extended or adjusted under 35 U.S.C. 154(b) by 452 days.

(21) Appl. No.: 10/848,904

(22) Filed: May 19, 2004

(65) Prior Publication Data

US 2005/0262169 A1 Nov. 24, 2005

(51) Int. Cl.
*G06F 17/30* (2006.01)
(52) U.S. Cl. ..................................... 707/203
(58) Field of Classification Search ......... 707/101–103, 707/204, 3, 203, 200, 9–10, 4; 726/2, 3, 726/4; 395/601, 561; 709/219
See application file for complete search history.

(56) References Cited

U.S. PATENT DOCUMENTS

| | | | | |
|---|---|---|---|---|
| 5,499,365 A | * | 3/1996 | Anderson et al. | 707/203 |
| 5,574,898 A | * | 11/1996 | Leblang et al. | 707/1 |
| 5,649,200 A | * | 7/1997 | Leblang et al. | 717/122 |
| 5,917,485 A | * | 6/1999 | Spellman et al. | 715/500.1 |
| 6,324,587 B1 | * | 11/2001 | Trenbeath et al. | 719/310 |
| 6,438,590 B1 | * | 8/2002 | Gartner et al. | 709/219 |
| 6,449,624 B1 | * | 9/2002 | Hammack et al. | 707/203 |
| 6,453,324 B1 | * | 9/2002 | Baisley et al. | 707/203 |
| 6,810,405 B1 | * | 10/2004 | LaRue et al. | 707/201 |
| 6,981,114 B1 | * | 12/2005 | Wu et al. | 711/162 |
| 7,100,195 B1 | * | 8/2006 | Underwood | 726/2 |
| 2001/0042073 A1 | * | 11/2001 | Saether et al. | 707/203 |
| 2002/0184259 A1 | * | 12/2002 | Akishita et al. | 707/501.1 |
| 2004/0055005 A1 | * | 3/2004 | Creswell et al. | 719/315 |
| 2005/0005259 A1 | * | 1/2005 | Avery et al. | 717/103 |
| 2005/0216506 A1 | * | 9/2005 | Theilmann et al. | 707/103 Y |
| 2006/0184589 A1 | * | 8/2006 | Lees et al. | 707/201 |

* cited by examiner

*Primary Examiner*—Hung T Vy
(74) *Attorney, Agent, or Firm*—Wayne A. Sivertson; Charles A. Johnson

(57) ABSTRACT

An apparatus for and method of efficiently accessing shared JavaScript objects within a multi-user environment by reducing the overhead required to maintain object/database property synchronization. A version is associated with each object to indicate whether any particular requested access is associated with the most current properties of the object. Each user has a version list which indicates whether any particular object properties need be updated before access. The version list is maintained in faster and more available memory than the actual object to enhance efficiency.

16 Claims, 14 Drawing Sheets

TYPICAL FUNCTIONS FOR DATASET OBJECT oDs:

oDs.addRecord({colVal{....{colVal50}}})
oDs.addRecords(numRecords{colVal{....{colVal50}}})
oDs.cancelRecordUpdate()
oDs.close({bulkUpdateOption})            //bulk update
oDs.column[columnID].name                //read only
oDs.column[columnID].size                //read only
oDs.column[columnID].value
oDs.columnCount                          //read only
oDs.copy()                               //returns Dataset object
oDs.create(container,oCrCols{.crReportTypes=crTemporary})  //creates new Dataset object
oDs.createFrom(container,source{.crReportTypes=crTemporary})  //creates new Dataset object
oDs.currentRecord
oDs.deleteRecords({numRecords=1})
oDs.findRecord(oFindRecordParams.recordNumber{.columnPosition}})
oDs.firstRecord()
oDs.insertRecord({colVal{....{colVal50}}})
oDs.insertRecords(numRecords{colVal{....{colVal50}}})
oDs.lastRecord()
oDs.name
oDs.nextRecord()
oDs.open(dataset-id,access{,wait=true})  //read only
oDs.oVerwrite
oDs.prevRecord()
oDs.RecordCount                          //controls Dataset result
oDs.remove()
oDs.save(container)                      //read only
oDs.searchRecord(oSearchRecordParams.recordNumber)  //deletes dataset and Dataset object
oDs.sort(oSortParams)                    //returns dataset ID

FIG. 3

VALUE-ADD POWER FUNCTIONS FOR DATASET OBJECTS oDs oDs.compareDatasets(.CompareParams.oCompareStatus)

//Dataset result is returned as controlled by the Dataset "overwrite" property
oDs.calculate(oCalculateParams{.numberOfRecords{.recordsProcessed}})
oDs.combineDatasets(oCombineParams{.recordsFound{.recordsCompared}})
oDs.find(oFindParams{.recordsFound})
oDs.interval(.IntervalParams{.oIntervalStatus})
oDs.search(oSearchParams{.recordsFound{.recordsSearched}})
oDs.tally(oTallyParams{.oTallyStatus})

FIG. 4

```
var oSearchParams = new SearcParams();

oSearchParams.caseSensitive oSearchParams.findNumeric oSearchParams.group oSearchParams.invert oSearchParams.maxFinds oSearchParams.numberOfRecordsToSearch oSearchParams.startRecordNumber oSearchParams.columnItem[n].columnInfo("columnid{{startPos{.endPos}}}"{.dateFormat})

oSearchParams.searchItem[n].addValueInfo(columnItem. value{.valueRange})

//Calling format
    oDs.search(oSearchParams{.recordsFound{.recordsSearched}})
```

FIG. 5

```
Partial JavaScript
    // Search "CustCode", "StCd" and last 4 characters of the "Product Type"
    // columns
    . . . .
    var srh = new SearchParams();
    srh.columnItem(1).columnInfo("CustCode");
    srh.columnItem(2).columnInfo("Product Type(6, 9)");
    srh.columnItem(3).columnInfo("StCd");
    srh.searchItem(1).addValueInfo(1, "amco");
    srh.searchItem(1).addValueInfo(2, "box0", "box1");
    srh.searchItem(1).addValueInfo(3, "ip");
    srh.searchItem(2).addValueInfo(3, "ip");              //can be out
    srh.searchItem(2).addValueInfo(2, "box2", "box3");    //of order
    srh.searchItem(2).addValueInfo(1, "intr");
    srh.searchItem(3).addValueInfo(1, "dico");
    srh.searchItem(3).addValueInfo(2, "box4", "box5");
    srh.searchItem(3).addValueInfo(3, "or");
    srh.searchItem(4).addValueInfo(1, "arco");
    srh.searchItem(4).addValueInfo(2, "box6", "box7");
    srh.searchItem(4).addValueInfo(3, "sh");
    srh.searchItem(5).addValueInfo(1, "amco");
    srh.searchItem(5).addValueInfo(2, "box8", "box9");
    srh.searchItem(5).addValueInfo(3, "or");
    var nFnd = nSrh = 0;
    ds2.search(srh, nFnd, nSrh);
```

FIG. 6

Equivalent MAPPER run-script:

@SRH.OB.2 ˙ ˙ 2-2.20-4.45-4 ˍ.ip.'box0'.amco'/r.ip.'box1'.amco'/ˍ.ip.'b\
ox2'.intr'/r.ip.'box3'.intr'/ˍ.or.'box4'.dico'/r.or.'box5'.dico'/ˍ.s\
h'.box6'.arco'/r.sh.'box7'.arco'/ˍ.or.'box8'.amco'/r.or.'box9'.amco'/\

Results:

| *St. *CD. | Status. Date. | By. In. | Product Type | Serial. Number. | Produc Cost | Order Number | Cust. Code | Produc Plan | Produc Actual | Ship Date | Ship Order | Spc Cod |
|---|---|---|---|---|---|---|---|---|---|---|---|---|
| IP | 831224 | LS | BLACKBOX1 | 436767 | | 84389 | AMCO | 831223 | 831224 | | | |
| IP | 831225 | LS | BLACKBOX1 | 436768 | | 84390 | AMCO | 831223 | 831225 | | | |
| IP | 831219 | LS | BLACKBOX2 | 637071 | | 84353 | INTR | 831218 | 831219 | | | |
| SH | 831203 | LS | BLACKBOX6 | 785367 | | 52833 | ARCO | 831201 | 831202 | 831203 | S8934 | |
| OR | 831217 | LS | BLACKBOX9 | | | 98755 | AMCO | | | | | |
| OR | 831210 | LS | GREENBOX5 | | | 99753 | DICO | | | | | |

FIG. 7

Partial JavaScript and Sample Output for SearchParams object/Update Dataset object

```
...                                                                              //1
var oSearchParams = new SearchParams();                                          //2
oSearchParams . columnItem[] .columnInfo("CustCode");                            //3
oSearchParams . searchItem[] . addValueInfo(l. "amco");                          //4
oSearchParams . update = true;                                                   //5
var oDsu = oDs . search(oSearchParams. recordsFound. recordsSearched);           //6
while (oDs . currentRecord() l - 0){                                             //7
if (oDsu.column("OrderNumbr"). value == "84389") {                               //8
   oDsu.prevRecord();          //reposition for deleted record                   //9
}else {                                                                          //10
   oDus.column("CustCode"). value = "abcd";                                      //11
   oDus . nextRecord(l);                                                         //12
}                                                                                //13
}                                                                                //14 oDsu.close(oDs, BupMerge);                        //bulk update merge            //15
// Available results                                                             //16
... recordsFound                                                                 //17
... recordsSearched
```

FIG. 8

Results at line 5 -- before bulk update:

| St Cd | Status Date | By In | Product Type | Serial Number | Produc Cost | Order Numbr | Cust Code | Produc Plan | Produc Actual | Ship Date | Ship Order | Spc Cod |
|---|---|---|---|---|---|---|---|---|---|---|---|---|
| IP | 831224 | LS | BLACKBOX1 | 436767 | 13500 | 84389 | AMCO | 831223 | 831224 | | | |
| IP | 831225 | LS | BLACKBOX1 | 436768 | 13600 | 84390 | AMCO | 831223 | 831225 | | | |
| IP | 831222 | LS | BLACKBOX5 | 737582 | | 84040 | AMCO | 831222 | 831222 | | | |
| IP | 831227 | LS | BLACKBOX7 | 733597 | | 84351 | AMCO | 831227 | 831227 | | | |
| OR | 831217 | LS | BLACKBOX9 | | | 98755 | AMCO | | | | | |
| SH | 831204 | LS | BLACKBOX9 | 714577 | | 64231 | AMCO | 831201 | 831203 | 831204 | S8531 | |
| SH | 831206 | LS | GREENBOX7 | 669624 | | 54682 | AMCO | 831201 | 831205 | 831204 | S8553 | |
| SC | 840110 | LS | GREENBOX8 | 975481 | | 99943 | AMCO | 84110 | | | | |
| OR | 830310 | LS | GREENBOX9 | | | 99951 | AMCO | | | | | |

FIG. 9

Results at line 5 — before bulk update:

| St Cd | Status Date | By In | Product Type | Serial Number | Produc Cost | Order Numbr | Cust Code | Produc Plan | Produc Actual | Ship Date | Ship Order | Spc Cod |
|---|---|---|---|---|---|---|---|---|---|---|---|---|
| IP | 831224 | LS | BLACKBOX1 | 436767 | | 84389 | ANCO | 831223 | 831224 | | | |
| IP | 831225 | LS | BLACKBOX1 | 436768 | | 84390 | abcd | 831223 | 831225 | | | |
| IP | 831219 | LS | BLACKBOX2 | 637071 | | 84353 | INTR | 831218 | 831219 | | | |
| OR | 840110 | LS | BLACKBOX4 | | | 94754 | ARCO | | | | | |
| SC | 840110 | LS | BLACKBOX5 | 675281 | | 97441 | FEDS | 840131 | | | | |
| IP | 831222 | LS | BLACKBOX5 | 737582 | | 84040 | abcd | 831222 | 831222 | | | |
| SH | 831203 | LS | BLACKBOX0 | 746327 | | 54237 | FEDS | 831201 | 831202 | 831203 | S8738 | |
| SH | 831202 | LS | BLACKBOX6 | 368061 | | 54438 | FEDS | 831201 | 831201 | 831202 | S6937 | |
| SH | 831209 | LS | BLACKBOX6 | 777324 | | 54232 | DICO | 831207 | 831208 | 831209 | S8538 | |
| SH | 831203 | LS | BLACKBOX6 | 785367 | | 52833 | ARCO | 831201 | 831202 | 831203 | S8934 | |
| IP | 831216 | LS | BLACKBOX6 | 926581 | | 89381 | INTR | 831215 | 831216 | | | |
| OR | 831210 | LS | BLACKBOX7 | | | 99842 | FEDS | | | | | |
| OR | 831227 | LS | BLACKBOX7 | | | 99725 | INTR | | | | | |
| SC | 840108 | LS | BLACKBOX7 | 665481 | | 97541 | FEDS | 840122 | | | | |
| IP | 831227 | LS | BLACKBOX7 | 733597 | | 84351 | abcd | 831227 | 831227 | | | |
| SH | 831202 | LS | BLACKBOX7 | 744627 | | 44232 | INTR | 831201 | 831201 | 831202 | S8531 | |
| IP | 831215 | LS | BLACKBOX7 | 933581 | | 84381 | FEDS | 831215 | 831215 | | | |
| OR | 831230 | LS | BLACKBOX8 | | | 92788 | FEDS | | | | | |
| SH | 831203 | LS | BLACKBOX8 | 945327 | | 74272 | FEDS | 831201 | 831202 | 831203 | S8518 | |
| OR | 831217 | LS | BLACKBOX9 | | | 98755 | abcd | | | | | |
| OR | 831210 | LS | BLACKBOX9 | | | 98782 | USSC | | | | | |
| IP | 831217 | LS | BLACKBOX9 | 538993 | | 84781 | USSC | 831215 | 831217 | | | |

FIG. 10

| Entity Event | Effect on Version property |
|---|---|
| Initial reference | Property value set to zero |
| Property query (non-deferred) | Current primary property value returned |
| Property query (deferred) | Current deferred property value returned |
| Begin deferred sequence | Copy primary property value to deferred property value |
| Update (immediate) | Increment primary property value by one |
| Update (deferred) | Increment deferred property value by one (primary unchanged) |
| Commit (deferred) | Copy deferred property value to primary property value |

FIG. 13

METHOD AND APPARATUS FOR SYNCHRONIZING DATASET OBJECT PROPERTIES WITH UNDERLYING DATABASE STRUCTURES

CROSS REFERENCE TO CO-PENDING APPLICATIONS

U.S. patent application Ser. No. 10/848,748, filed May 19, 2004, and entitled, "Method and Apparatus for Argumented Update of Dataset Records in a JavaScript Environment"; U.S. patent application Ser. No. 10/849,420, filed May 19, 2004, and entitled, "Method and Apparatus for Argument Parameterization of Complex Dataset Operations"; U.S. patent application Ser. No. 10/849,469, filed May 19, 2004, and entitled, "Method and Apparatus for Dataset Manipulation in a Javascript Environment"; U.S. patent application Ser. No. 09/188,629, filed Nov. 9, 1998, and entitled, "Cool ICE data Wizard"; U.S. patent application Ser. No. 09/188,649, filed Nov. 9, 1998, and entitled, "Cool ICE Column Profiling"; U.S. patent application Ser. No. 10/848,473, filed May 19, 2004, entitled, "Cool ICE OLEDB Consumer Interface"; and U.S. patent application Ser. No. 09/188,725, filed Nov. 9, 1998, and entitled, "Cool ICE State Management" are commonly assigned copending.

BACKGROUND OF THE INVENTION

1. Field of the Invention

The present invention generally relates to legacy data base management systems and more particularly relates to enhancements for providing JavaScript access to such legacy data base management systems in an efficient multi-user environment.

2. Description of the Prior Art

Data base management systems are well known in the data processing art. Such commercial systems have been in general use for more than 20 years. One of the most successful data base management systems is available from Unisys Corporation and is called the Classic MAPPER® data base management system. The Classic MAPPER system can be reviewed using the Classic MAPPER User's Guide which may be obtained from Unisys Corporation.

The Classic MAPPER system, which runs on proprietary hardware also available from Unisys Corporation and on an industry compatible personal computer under a Windows Server operating system, provides a way for clients to partition data bases into structures called filing cabinets and drawers, as a way to offer a more tangible format. The BIS (Business Information System) data base manager utilizes various predefined high-level instructions whereby the data base user may manipulate the data base to generate human-readable data presentations called "reports". The user is permitted to prepare lists of the various predefined high-level instructions into data base manager programs called "BIS Script". Thus, users of the Classic MAPPER system may create, modify, and add to a given data base and also generate periodic and aperiodic reports using various BIS Script.

However, with the Classic MAPPER system, as well as with similar proprietary data base management systems, the user must interface with the data base using a terminal coupled directly to the proprietary system and must access and manipulate the data using the BIS Script command language of Classic MAPPER. Ordinarily, that means that the user must either be co-located with the hardware which hosts the data base management system or must be coupled to that hardware through dedicated telephone, satellite, or other data links. Furthermore, the user usually needs to be schooled in the command language of Classic MAPPER (or other proprietary data base management system) to be capable of generating BIS Script.

Since the advent of large scale, dedicated, proprietary data base management systems, the Internet or world wide web has come into being. Unlike closed proprietary data base management systems, the Internet has become a world wide bulletin board, permitting all to achieve nearly equal access using a wide variety of hardware, software, and communication protocols. Even though some standardization has developed, one of the important characteristics of the world wide web is its ability to constantly accept new and emerging techniques within a global framework. Many current users of the Internet have utilized several generations of hardware and software from a wide variety of suppliers from all over the world. It is not uncommon for current day young children to have ready access to the world wide web and to have substantial experience in data access using the Internet.

Thus, the major advantage of the Internet is its universality. Nearly anyone, anywhere can become a user. That means that virtually all persons are potentially Internet users without the need for specialized training and/or proprietary hardware and software. One can readily see that providing access to a proprietary data base management system, such as Classic MAPPER, through the Internet would yield an extremely inexpensive and universally available means for accessing the data which it contains and such access would be without the need for considerable specialized training.

There are two basic problems with permitting Internet access to a proprietary data base. The first is a matter of security. Because the Internet is basically a means to publish information, great care must be taken to avoid intentional or inadvertent access to certain data by unauthorized Internet users. In practice this is substantially complicated by the need to provide various levels of authorization to Internet users to take full advantage of the technique. For example, one might have a first level involving no special security features available to any Internet user. A second level might be for specific customers, whereas a third level might be authorized only for employees. One or more fourth levels of security might be available for officers or others having specialized data access needs.

Existing data base managers have security systems, of course. However, because of the physical security with a proprietary system, a certain degree of security is inherent in the limited access. On the other hand, access via the Internet is virtually unlimited which makes the security issue much more acute.

Current day security systems involving the world wide web involve the presentation of a user-id. Typically, this user-id either provides access or denies access in a binary fashion. To offer multiple levels of secure access using these techniques would be extraordinarily expensive and require the duplication of entire databases and or substantial portions thereof. In general, the advantages of utilizing the world wide web in this fashion to access a proprietary data base are directly dependent upon the accuracy and precision of the security system involved.

The second major problem is imposed by the Internet protocol itself. One of the characteristics of the Internet which makes it so universal is that any single transaction in HTML language combines a single transfer (or request) from a user coupled with a single response from the Internet server. In general, there is no means for linking multiple transfers (or requests) and multiple responses. In this manner, the Internet utilizes a transaction model which may be referred to as "stateless". This limitation ensures that the Internet, its users, and its servers remain sufficiently independent during operation that no one entity or group of entities can unduly delay or "hang-up" the communications system or any of its major components. Each transmissions results in a termination of the transaction. Thus, there is no general purpose means to link data from one Internet transaction to another, even though in certain specialized applications limited amounts of data may be coupled using "cookies" or via attaching data to a specific HTML screen.

However, some of the most powerful data base management functions or services of necessity rely on coupling data from one transaction to another in dialog fashion. In fact this linking is of the essence of BIS Runs which assume change of state from one command language statement to the next. True statelessness from a first BIS command to the next or subsequent BIS command would preclude much of the power of Classic MAPPER (or any other modern data base management system) as a data base management tool and would eliminate data base management as we now know it.

A further feature of the "state-managed" legacy data base management systems is the opportunity to define, initialize, and execute stored procedures. These are essentially software programs scripted in the command language of the data base management system which may be defined and later initialized and executed upon a subsequent occasion. The very concept of this functionality is inconsistent with the stateless operation of the Internet.

A particular problem associated with permitting standard script (e.g., JavaScript) access to such a system is synchronization of the data base within a multi-user environment. Both restriction to single user and prior art approaches to synchronization of the data base tend to be inefficient and require substantial overhead.

SUMMARY OF THE INVENTION

The present invention overcomes the disadvantages of the prior art by providing a method of and apparatus for efficiently synchronizing the data base when using the power of a fill featured legacy data base management system by a user at a terminal coupled to the world wide web or Internet using a standardized object-based command language. In order to permit any such access, the present invention must first provide a user interface, called a gateway, which translates transaction data transferred from the user over the Internet in HTML format into a format from which data base management system commands and inputs may be generated. The gateway must also convert the data base management system responses and outputs into an HTML document for display on the user's Internet terminal. Thus, as a minimum, the gateway must make these format and protocol conversions. In the preferred embodiment, the gateway resides in the web server coupled to the user via the world wide web and coupled to proprietary data base management system.

To make access to a proprietary legacy data base by Internet users practical, a sophisticated security system is required to prevent intentional or inadvertent unauthorized access to the sensitive data of an organization. As discussed above, such a security system should provide multiple levels of access to accommodate a variety of authorized user categories. In the preferred embodiment of the present invention, rather than defining several levels of data classification, the different classes of users are managed by identifying a security profile as a portion of those service requests requiring access to secure data. Thus, the security profile accompanies the data/service to be accessed. The user simply need provide a user-id which correlates to the access permitted. This permits certain levels of data to be accessed by one or more of the several classes of user.

In the preferred mode of practicing the present invention, each user-id is correlated with a security profile. Upon preparation of the service request which provides Internet access to a given portion of the data base, the service request developer specifies which security profiles are permitted access to the data or a portion thereof. The service request developer can subsequently modify the accessibility of any security profile. The utility of the system is greatly enhanced by permitting the service request developer to provide access to predefined portions of the data, rather than being limited to permit or deny access to all of the data involved.

Whereas the gateway and the security system are the minimum necessary to permit the most rudimentary form of communication between the Internet terminal of the user and the proprietary data base management system, as explained above, the Internet is a "stateless" communication system; the addition of the gateway and the security system do not change this statelessness. To unleash the real power of the data base management system, the communication protocol between the data base and the user requires functional interaction between the various data transfers.

The present invention adds state management to this environment. Instead of considering each transfer from the Internet user coupled with the corresponding server response as an isolated transaction event as defined by the world wide web, one or more related service requests may be functionally associated in a service request sequence as defined by the data base management system into a dialog.

A repository is established to store the state of the service request sequence. As such, the repository can store intermediate requests and responses, as well as other data associated with the service request sequence. Thus, the repository buffers commands, data, and intermediate products utilized in formatting subsequent data base management service requests and in formatting subsequent HTML pages to be displayed to the user.

The transaction data in HTML format received by the server from the user, along with the state information stored in the repository, are processed by a service handler into a sequence of service requests in the command language of the data base management system. Sequencing and control of the data base management system is via an administration module.

Through the use of the repository to store the state of the service request sequence, the service handler to generate data base management command language, and the administration module, the world wide web user is capable of performing each and every data base management function available to any user, including a user from a proprietary terminal having a dedicated communication link which is co-located with the proprietary data base management system hardware and software. In addition, the data base management system user at the world wide web terminal is able to accomplish this in the HTML protocol, without extensive training concerning the command language of the data base management system.

In accordance with the preferred embodiment of the present invention, a new command, @SPI (stored procedure interface) is defined for the Business Information Server (BIS)/Cool ICE system. The new command has two primary modes of operation. First, the command provides the ability to execute a specified stored procedure and return the results. This includes the handling of rowsets, input variables, output variables, and input/output variables. Secondly, the command provides a method to query and return meta-data about stored procedures in a data base catalog. The meta-data will provide the available stored procedures as well as information about the parameters for the stored procedures.

Meta-data are data about data. It is a way of documenting data sets. The information contained in meta-data documents the creation of a data set and gives an idea of what the cartographic product to which it is attached was designed to do.

Rowsets are the central objects that enable DB (data base) components to expose and manipulate data in tabular form. A rowset object is a set of rows in which each row has columns of data. For example, providers present data, as well as meta-data, to consumers in the form of rowsets. Query processors present query results in the form of rowsets. The use of rowsets throughout data base systems makes it possible to aggregate components that consume or produce data through the same object.

Without the present invention, the user must write the C code and make the proper API (Application Program Interface) calls to execute the stored procedure as well as handle input, output, and input/output variables. This is a difficult process and requires in depth knowledge of the data base API interface, in addition to the pitfalls of having to develop application code (memory allocation, pointer manipulation, configuring enough variable space, handling input/output variables, etc.). In addition to writing the application code and submitting the proper stored procedure command, users previously had no real mechanism to manipulate any data that is retrieved from the data source.

The present invention provides users the ability to execute a specified stored procedure as well as handle rowsets, input variables, output variables, and input/output variables without having to develop the application code themselves. Developing the code is a very cumbersome process with a lot of room for errors. Furthermore, the developer must be very knowledgeable concerning the API interface in order to correctly make proper calls.

In accordance with the preferred mode of the present invention, the user can access the underlying MAPPER data manipulation capabilities in a JavaScript object-based programming environment. Therefore, programmers knowledgeable in the practices of standard programming languages such as JavaScript can readily apply those skills to utilize the data manipulation and other capabilities derived from the underlying MAPPER engine. Each JavaScript represents a stored procedure of varying degrees of complexity that can be called from various development and application software within the BIS product suite. Previously, these MAPPER engine capabilities were available using the proprietary MAPPER run-script procedural language.

In the preferred implementation, the JavaScript parser and objects are integrated into the MAPPER engine to support JavaScript stored procedures. The integrated JavaScript parser interprets and executes JavaScript stored procedures, which utilize custom JavaScript objects. These custom capabilities in an object-based, paradigm for dataset manipulation and analysis purposes. Additional custom JavaScript objects are also provided to support the more complex MAPPER core engine "power" function analysis capabilities. JavaScript stored procedures are an alternative to MAPPER run-script, input and output arguments can be passed, as well as an input dataset, and a resulting dataset can be returned to the caller.

A key to making this process efficient is the technique for "parameterization" of the underlying MAPPER "power" commands. In order to leverage the more complex MAPPER core engine "power" function analysis capabilities, it is necessary for the programmer to supply a set of arguments. The arguments are positional and the number can range from just a few to many dozens. As the number of arguments increases, the burden of programming them can become unmanageable.

As originally conceived, the MAPPER engine power functions were invoked via the procedural MAPPER run-script language. This interface is satisfactory for programming simple sets of arguments, although it has the inherent disadvantage of requiring intricate knowledge of the proprietary MAPPER run-script language syntax. This syntax is very efficient, but at the tradeoff of being cryptic and therefore error prone and requiring specialized training. As the number of arguments increases, the programming task becomes daunting.

To compliment the JavaScript Dataset object, which represents a physical MAPPER database table, a suite of parameter objects is provided to allow programming the numerous combinations of arguments that parameterize the processing performed by MAPPER core engine power function analysis functions. A separate JavaScript Parameter object is provided for each of the MAPPER core engine power functions. Each parameter object contains custom properties, methods, and compound objects that conform to the programming requirements of a specific power function.

A JavaScript object, representing a physical data base table, contains property values representing attributes of the underlying table. These properties relate to physical table attributes, which may change their values when the table is modified. Furthermore, methods of the JavaScript table object are used by the script designer to read and modify records in the underlying table. The correct execution of these methods depends on the properties of the object correctly reflecting (i.e., being in synchronization with) the state of the underlying physical data base table. If synchronization is not properly maintained, the method may fail, causing application failure and possibly corruption of the underlying table.

In a single-user system that only allows a single object instance to be associated with a particular data base table instance, maintaining property synchronization is usually fairly straightforward. This is because any object method whose execution results in a modification of any physical attribute of the table is also associated with the object instance whose properties need to be updated as a result of the method execution. In this environment, the method implementation code can update the affected object property or properties upon successful completion of the method.

However, in a system that allows multiple JavaScript object instances to be associated with the same underlying physical data base table, the above mechanism of maintaining synchronization is not effective. This scenario exists in either a multi-user system, or single-user system that allows multiple concurrent object instances. In either of these environments, a method executed on one object instance, which results in a modification of an underlying data base table property or properties, is not inherently reflected in all object instances associated with the table, possibly leading to the detrimental effects described above.

The traditional approach to this problem has been to unconditionally refresh the JavaScript object's properties from the physical data base. To be effective, this must be performed after the user has established a read or update lock on the table. The problem with this approach is that in most situations, the object's property values are in fact still valid because the table has not been modified since the object last retrieved the properties from the physical data base table. Thus, the significant overhead involved in the refresh operation is effectively wasted.

In the preferred mode, an additional property is described in the physical data base table and corresponding property in the JavaScript table object. This property is referred to as the Version property. The purpose of this property is to track the number of modifications made to its associated data base table. In the preferred embodiment the invention within the commercial product, Unisys BIS, one Version property is implemented per data base table (dataset), because the system uses only table-level locking. However, the scope of the invention also permits version properties to be maintained at the table page and/or record level in data base systems that support locking of these entities.

The essential element is that JavaScript object implementation code be able to quickly compare the current version property value of the data base table to the version property value stored in the JavaScript object the last time the physical data base table properties were retrieved. If the values are the same, no refresh of the object's properties is required. If the values differ, they must be refreshed before proceeding with any table reference. It is preferable as more efficient that the version property is not a persistent property of the database table. However, other embodiments may choose to make it persistent in order to implement enhanced update tracking statistics. In accordance with the data base manager of the preferred mode, deferred updating with commit points is supported, as well as immediate (non-deferred) updating. In a deferred updating environment, the database system must maintain two version properties, which may be referred to as the property's primary and deferred copies. The primary version property is one that is visible to all users except the user actually holding update lock on the modifiable entity. Conversely, the deferred version property is visible only to this user.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 3 is listing of the script for a typical function;

FIG. 4 is a listing of the script for value-add power functions;

FIG. 5 is listing of a typical search parameter object;

FIG. 6 is a listing of the JavaScript to perform a search utilizing the search parameter object of FIG. 5;

FIG. 7 is a listing if the BIS script prepared in accordance with the JavaScript of FIG. 6, along with the resultant report after performance of the search;

FIG. 8 is a sample JavaScript listing of s typical application of the bulk update capability;

FIG. 9 is a MAPPER type report in accordance with the example of FIG. 21 before bulk update;

FIG. 10 is a MAPPER type report in accordance with the example of FIG. 8 after bulk update;

FIG. 13 is a table showing maintenance of the version property; and

DETAILED DESCRIPTION OF THE PREFERRED EMBODIMENTS

The present invention is described in accordance with several preferred embodiments which are to be viewed as illustrative without being limiting. These several preferred embodiments are based upon Series 2200 hardware and operating systems, the Classic MAPPER data base management system, and the BIS/Cool ICE software components, all available from Unisys Corporation. Also commercially available are industry standard personal computers operating in a Windows environment.

Figure 1:
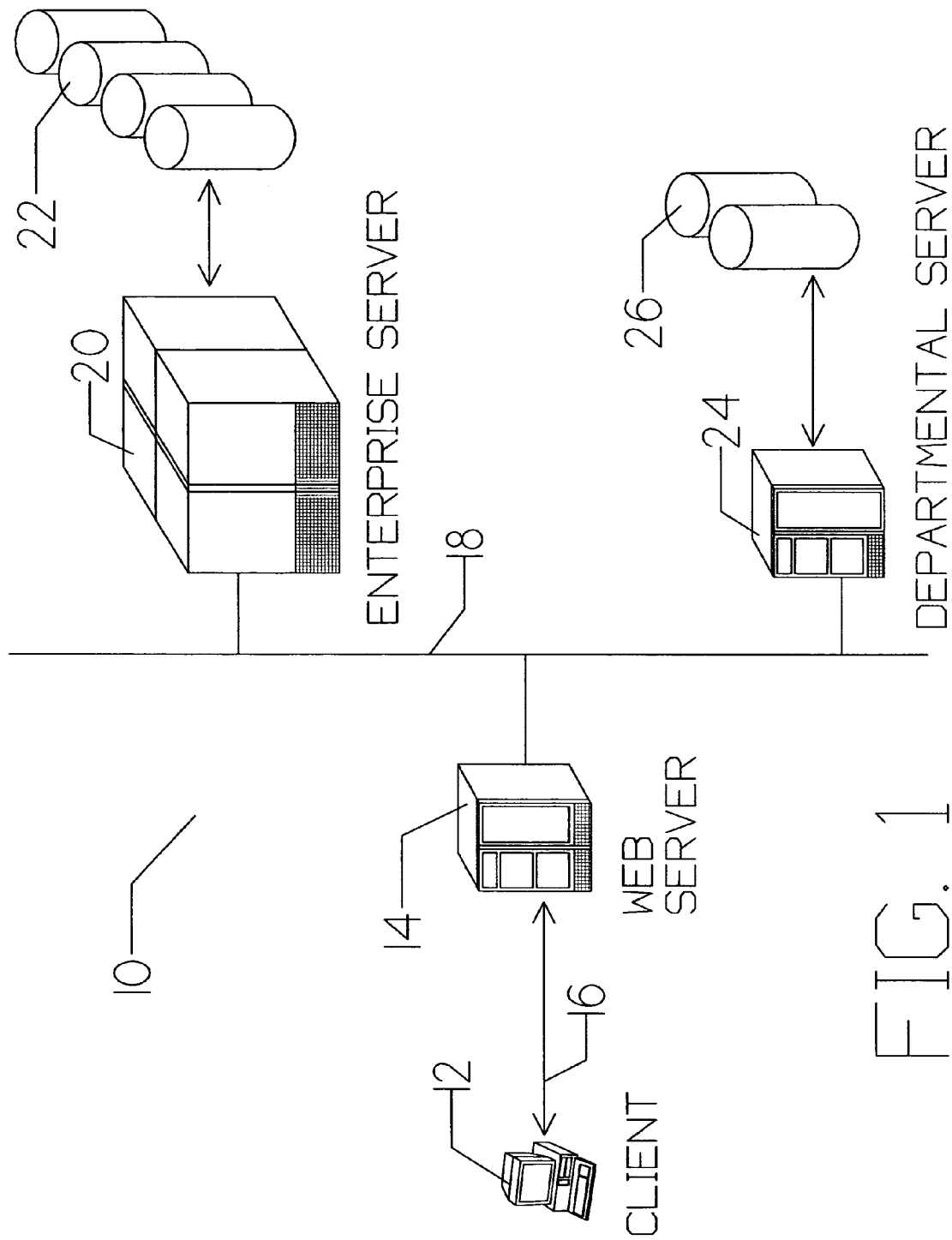
FIG. 1 is a pictographic view of the hardware of the preferred embodiment.

FIG. 1 is a pictorial diagram of hardware suite 10 of the preferred embodiment of the present invention. The client interfaces with the system via Internet terminal 12. Preferably, Internet terminal 12 is an industry compatible, personalized computer having a current version of the Windows operating system and suitable web browser, all being readily available commercial products. Internet terminal 12 communicates over world wide web access 16 using standardized HTML protocol, via Web Server 14.

The BIS/Cool ICE system is resident in Enterprise Server 20 and accompanying storage subsystem 22, which is coupled to Web Server 14 via WAN (Wide Area Network) 18. In the preferred mode, Web Server 14 is owned and operated by the enterprise owning and controlling the proprietary legacy data base management system. Web Server 14 functions as the Internet access provider for Internet terminal 12 wherein world wide web access 16 is typically a dial-up telephone line. This would ordinarily be the case if the shown client were an employee of the enterprise. On the other hand, web server 14 may be a remote server site on the Internet if the shown client has a different Internet access provider. This would ordinarily occur if the shown client were a customer or guest.

In addition to being coupled to WAN 18, Enterprise Server 20, containing the BIS/Cool ICE system, is coupled to departmental server 24 having departmental server storage facility 26. Additional departmental servers (not shown) may be similarly coupled. The enterprise data and enterprise data base management service functionality typically resides within enterprise server 20, departmental server 24, and any other departmental servers (not shown). Normal operation in accordance with the prior art would provide access to this data and data base management functionality.

In the preferred mode of the present invention, access to this data and data base management functionality is also provided to users (e.g., Internet terminal 12) coupled to Intranet 18. As explained below in more detail, web server 14 provides this access utilizing the BIS/Cool ICE system.

Figure 2:
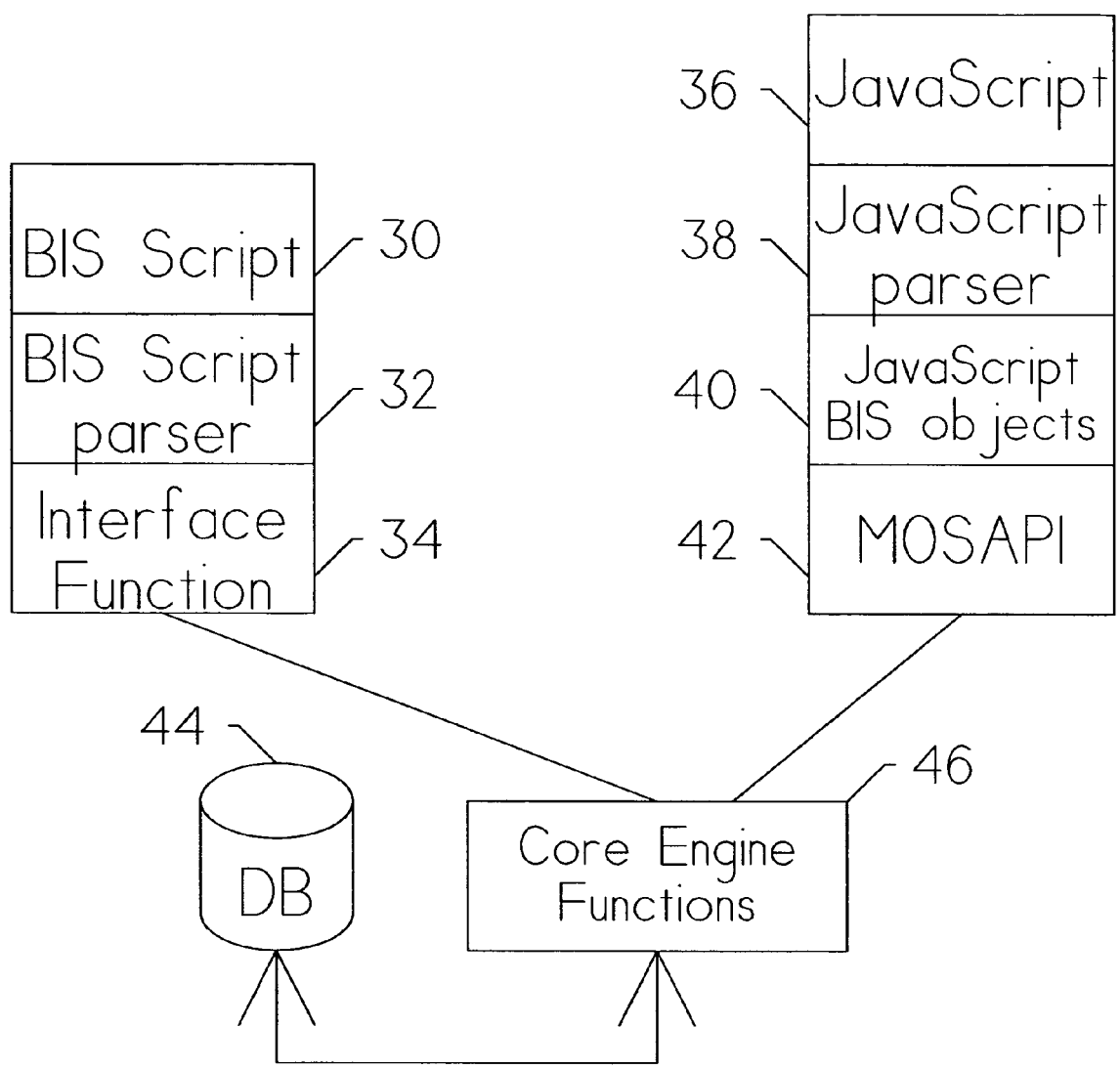
FIG. 2 is a detailed flow diagram showing integration of the MAPPER engine with the JavaScript procedures.

FIG. 2 is a detailed flow diagram showing integration of JavaScript with the MAPPER engine. In accordance with the preferred mode of the present invention, JavaScript 36 is presented to JavaScript parser 38 for processing. As a result, JavaScript BIS objects 40 are created for MOSAPI 42, which interfaces with Core Engine Functions 46.

Similarly, BIS script 30 is provided to BIS script parser 32 for initial processing. Interface function 34 presents an equivalent interface to Core Engine Functions 46. In either case, access to DataBase 44 is made by Core Engine Functions 46.

FIG. 3 is a listing of typical dataset object methods and properties.

FIG. 4 is a listing of the script for value-add power methods. Many of the functions can use bulk update processing. In the example shown, the search power function is used for illustration purposes.

FIG. 5 is a listing of a typical search parameter object. Other power methods have compatible parameter objects. The arguments are programmed in terms of a standardized object-based programing language, such as JavaScript. Parameters to tailor the overall processing are programmed using "root" properties of the Parameter object. For example, the Search Params "invert" property controls whether the resulting search records are those that match or those that do not match the specified column/value criteria.

Related attributes for a particular argument are programmed as a coherent set. For example, the columnInfo( ) method of the columnitem[ ] compound object of the SearchParams object allows the programmer to specify all of the necessary parameterization for a column to be used in the search( ) power method. In this case the parameterization includes the identity of a column to be searched, along with an optional date format. For example:

.SearchParams.columnItem[1].columnInfo("col1", dtYYYMMDD)

Similarly, the addvalueInfo( ) method of the searchItem[ ] compound object of the SearchParams object allows the programmer to specify all of the necessary parameterization for an item to be searched:

oSearchParams.searchItem[1].addValue(1,20000101, 20001231)

The parameterization includes the identity of the column in terms of its columnItem[ ] index (argument 1) along with the value and optional range value for the matching. A given column Item [ ] index array may be re-used in other search items without having to re-program the column specifications.

In the case of the search( ) power method, up to 80 columns and up to 5 search items can be programmed. Each search item allows up to 25 values to be specified such that a record is considered to match if it matches all values for any given search item. In effect the values for a given search item are processed as an AND condition and the set of search items are processed as an OR condition.

Programming up to 80*5*25 parameters is much more easily accommodated using the SearchParams object rather than the procedural MAPPER run-script. The other MAPPER power method Parameter objects include: calculate( ); combineDatasets( ); compareDatasets( ); find( ); findRecord( ); interval( ); searchRecord( ); sort( ); and tally( ). Each of the Dataset object power method receives the parameterization arguments as a specific Parameter object that has been programmed with the desired criteria.

FIG. 6 is a listing of the JavaScript definition for the sample search activity.

FIG. 7 show the equivalent BIS Script SRH statement to perform the search defined by the JavaScript of FIG. 19. Also shown is the resultant MAPPER report which provides the output of the requested search process.

As is apparent from this example, programming this search activity is straightforward using the SearchParams object, as has been discussed above.

FIG. 8 is a JavaScript listing for a typical bulk update process. Several of the power functions can produce an update dataset object. This provides that records can be searched, lines can be deleted, other power functions can be performed to this update dataset object. The modifications to the update dataset can be either "merged" back into the data base or "deleted" leaving the dataset in its original form within the data base.

The update dataset object creatqion can only be performed against a permanent dataset. The overwrite property must be false in order to create an update dataset object. Whne setting a power function parameter object update property to true and executing that power function, and update dataset is created. The changes performed on the update dataset can be deleted (i.e., not written back into the data base) or merged back into the original update datset by performing a close( ) function.

Any additional processing desired will restart with the original dataset.

After processing an update dataset, the close( ) dataset method is called. There are three different settings that can be specified with regard to processing the update dataset into the original dataset. These settings are: 1) merge the modifications back in to the original dataset; 2) delete the updated data from the original dataset; or 3) cancel the updates and leave the original dataset unaffected. The close( ) dataset method always closes the update and original dataset objects.

Thus, the user can request the close( ) method to "merge", "delete", or "cancel". The merge option (bupMerge bulk update enumeration) merges the data into the original dataset and closes the update and original dataset objects. The delete option (bupDelete bulk update enumeration) deletes the data from the original dataset and closes the update and original dataset objects. The cancel option (bupCancel bulk update enumeration) cancels the bulk update, leaving the original dataset unaffected and the update and original dataset objects closed.

FIG. 9 is a MAPPER type report showing the sample dataset before the bulk update.

FIG. 10 is a MAPPER type report showing the dataset following the bulk update process. The modifications are performed in accordance with the detailed flow chart of FIG. 24.

Figure 11:
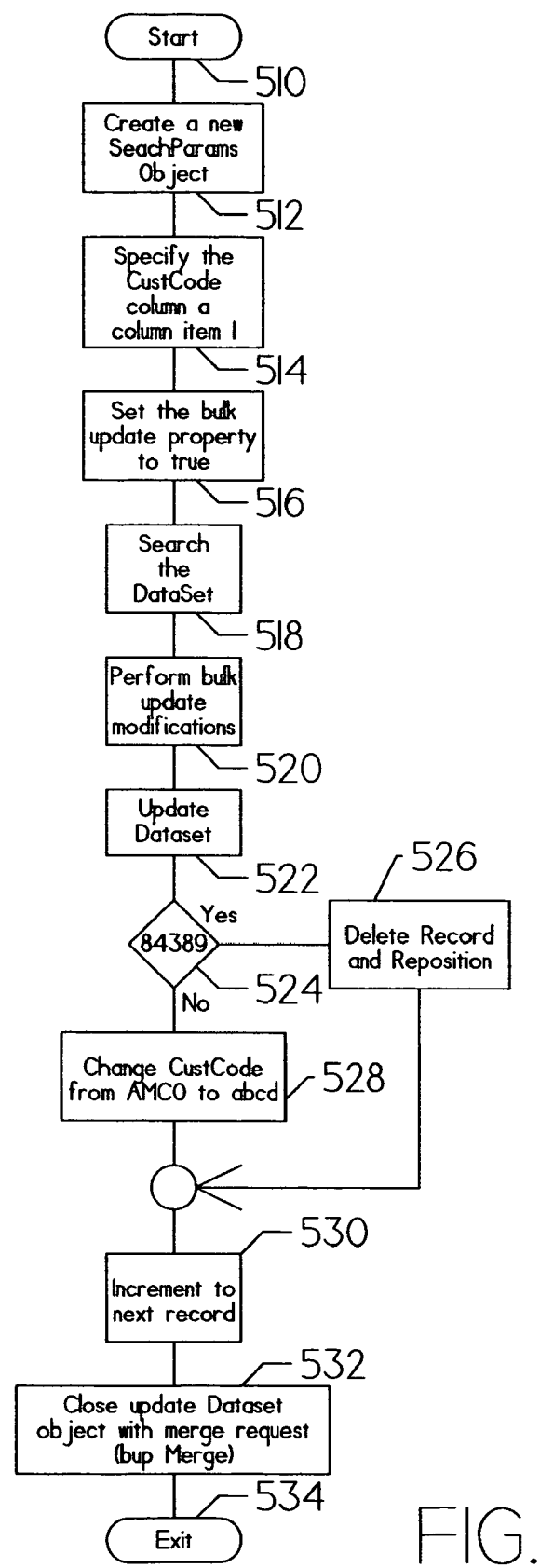
FIG. 11 is a detailed flow chart showing execution of the example of FIG. 8.

FIG. 11 is a detailed flow chart showing operation of the bulk update process. Entry is via element 510. At element 512, a new SearchParam object is created, as explained in detail above. Element 514 specifies the customer code as column item 1. See also the CustCode column of FIG. 22. The update parameter is set to "true" at element 516. This eases bulk update search( ) processing to occur at element 518 rather than the normal search( ) power function processing.

The dataset is actually searched at element 518. The "overwrite" property is initially set to "false" if the dataset is opened for update access with "permanent" data. The update dataset object can only be performed on a permanent report. The "overwrite" property cannot be set to "true" when processing an update dataset. When requesting a search( ) power function with an update SearchParams object the outcome will always generate a new update dataset.

Element 520 performs the bulk update modifications (see also lines 6-14 of FIG. 8). Element 522 continues until all data has been processed. The OrderNumbr column (see also FIG. 9) is searched for "84389" at element 524. If found, element 526 deletes the corresponding record and repositions the remainder. If not, element 528 changes the CustCode (see also FIG. 9) from AMCO to abcd. Element 530 increments to the next record. After completion, element 532 closes the update dataset object with the merge request. Exit is via element 534.

Figure 12:
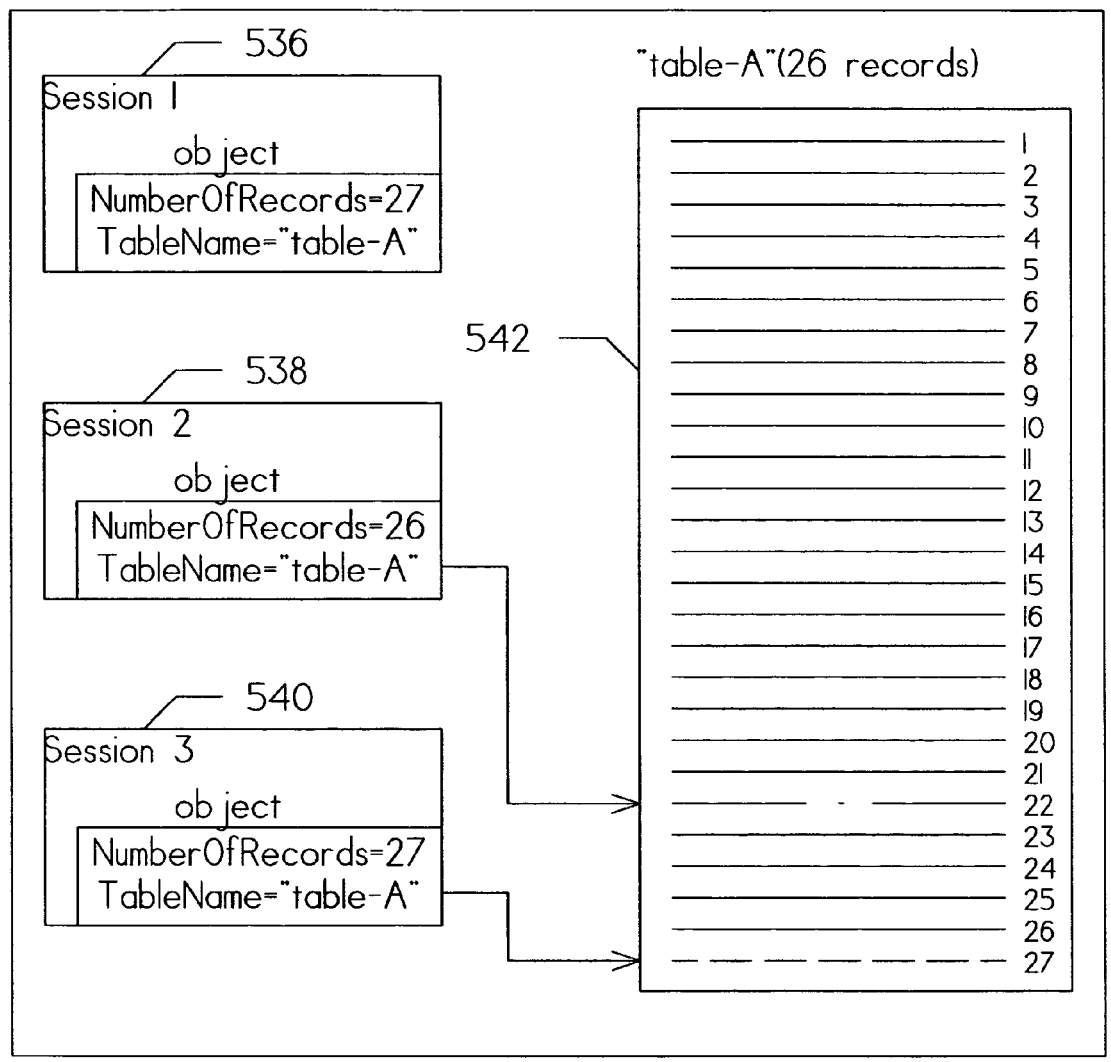
FIG. 12 is a detailed diagram showing an example of object modification in a multi-user environment.

FIG. 12 is a diagram showing an example of the need for synchronization within a multi-user environment. An effective synchronization mechanism is required in a system that allows multiple JavaScript object instances to be associated with the same underlying physical data base table. This scenario exists in either a multi-user system, or single-user system that allows multiple concurrent object instances. In either case, a method executed on one object instance, which results in a modification of an underlying data base table property or properties, is not inherently reflected in all object instances associated with the table, possibly leading to the detrimental effects discussed above.

Sessions 536, 538, and 540 have each created JavaScript objects, each referencing the same physical data base table 542. Each object has retrieved, among others, a property value indicating how many records the table contains (i.e., NumberOfRecords). Session 538 acquires an update lock on physical data base table 542. Session 538 executes the DeleteRecord( ) method of its object, deleting record number 22 from physical data base table 542.

Session 540 then executes the ReadRecord( ) method of its object, attempting to read the last record in the table, which according to its saved NumberOfRecords property should be record number 27. However, since record number 22 has been deleted by Session 538, there are now only 26 remaining records in the table, causing the method to fail and generate an exception absent the apparatus and methodology of the present invention.

A special property is added in the physical data base table along with a corresponding property in the JavaScript table object. This property is referred to as the Version property. The purpose of this property is to track the number of modifications made to its associated data base table. In the preferred embodiment, one version property is implemented per data base table (dataset), because the system uses only table-level locking. However, the scope of the invention also permits version properties to be maintained at the table page and/or record level in data base systems that support locking of these entities.

It is essential that JavaScript object implementation code be able to quickly compare the current version property value of the data base table to the version property value stored in the JavaScript object the last time the physical data base table properties were retrieved. If the values are the same, no refresh of the object's properties is required. If the values differ, they must be refreshed before proceeding with any table reference.

FIG. 13 is a table showing maintenance of the version property. In the preferred embodiment, the version property is not a persistent property of the database table. However, other embodiments may choose to make it persistent in order to implement enhanced update tracking statistics.

The data base manager in the preferred embodiment supports deferred updating with commit points, as well as immediate (non-deferred) updating. In a deferred updating environment, the data base system must maintain two version properties, which may be referred to as the property's primary and deferred copies. The primary version property is visible to all users except the user actually holding update lock on the modifiable entity. Conversely, the deferred version property is visible only to that user. Maintenance of the version property is as shown in the table.

Figure 14:
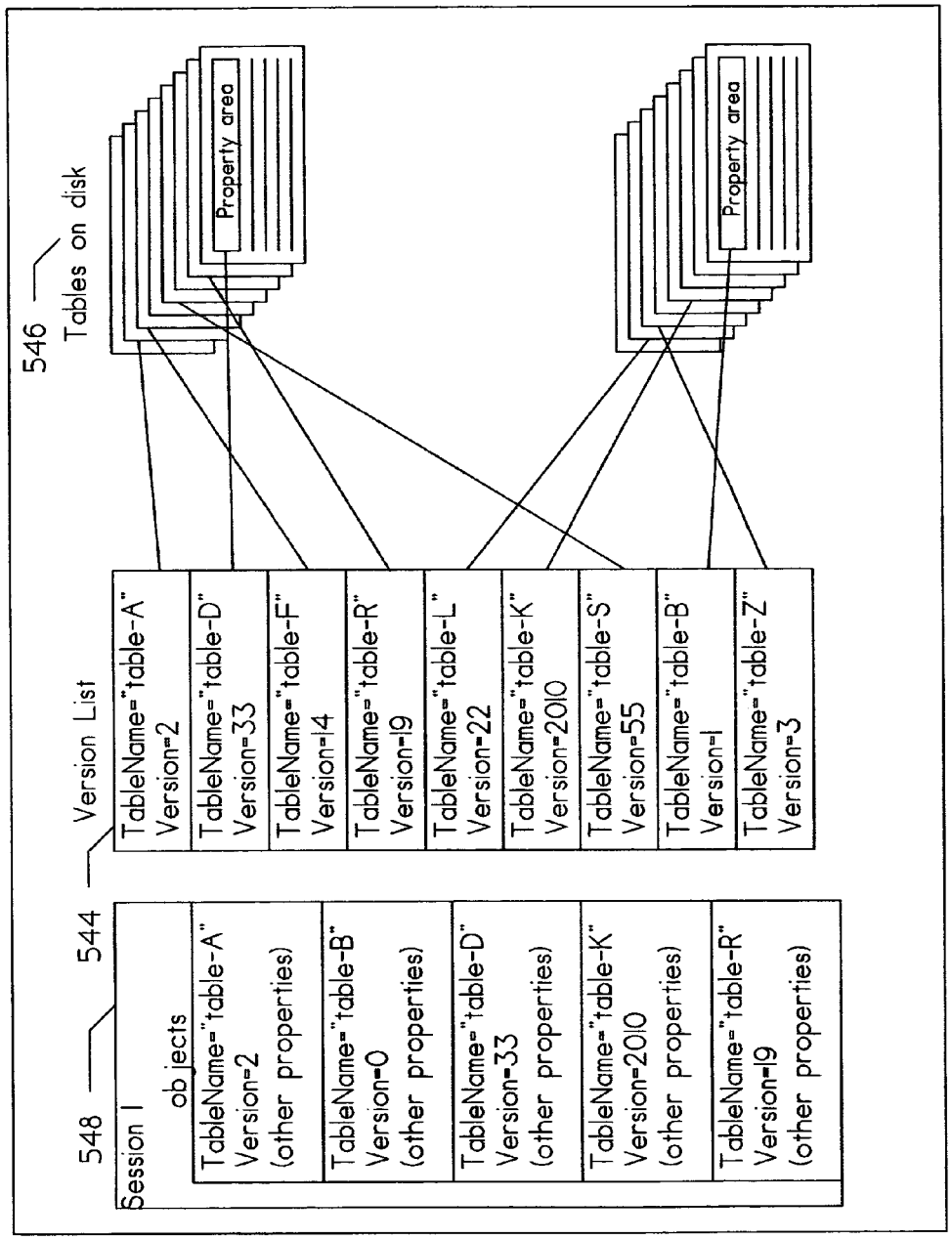
FIG. 14 is a detailed diagram showing the relationship of the major components.

FIG. 14 is a diagram showing operation of all of the key components. Session 548 contains five JavaScript table objects, each associated with a different physical table in the data base. At the time each object was initially constructed and associated with a table, the object made a request to the data base manager to open the table, and retrieve its current properties. The data base manager maintains Version List 544, containing the current version numbers for all physical tables currently being referenced in the system (i.e., each table that has at least one user object associated with it). Version List 544 is maintained in memory, not on disk, so access to it is very fast. This table can be thought of as a version "cache".

It is assumed that the user desires to call the GetNumberOfRecords( ) method on each of its five table objects. This method logically references the object's NumberOfRecords property. However, because this is a multi-user data base system, and the physical table is not open in the object (some methods may cause the table to be closed), the GetNumberOfRecords( )must determine if the value of the property is still valid.

It calls the data base manager's RefreshProperties( ) function, passing as arguments, the values of the object's TableName and Version properties. The RefreshProperties( ) function looks up the table name in version list 544. It then compares the passed version number to the table's version in Version List 544. If they are the same, the object's properties are valid, and no reference is made to physical table 546, located on disk, to retrieve the properties. No data is returned to the object.

When the function returns, the GetNumberOfRecords( ) method recognizes that its properties are current, and simply returns the NumberOfRecords property from the object. However, when this method is called on the object associated with "table-B", the RefreshProperties( ) is passed a version value of 0 (i.e., zero). The function performs a lookup in Version List 544 and compares the passed version (0) to the version number in Version List 544. This time they differ because the corresponding physical table has been modified by another session, since this user has last refreshed the object properties. RefreshProperties( ) must then make a reference to the physical table to retrieve all required properties and return them to the object.

In an alternate embodiment of this invention, a distributed client-server environment, this invention also minimizes network traffic between the client (holding the JavaScript object) and the data base server (holding the Version List and physical tables). In this approach, the client implementation of RefreshProperties( ) sends a very short message to the server, passing the argument information described above. The server compares the passed version for the specified table with the version in the server Version List. If no refresh is required, as simple acknowledgment is returned. Otherwise, the property information is returned.

Having thus described the preferred embodiments of the present invention, those of skill in the art will be readily able to adapt the teachings found herein to yet other embodiments within the scope of the claims hereto attached.

We claim:

1. An apparatus for permitting a plurality of users to manipulate data within a data processing system comprising:
   a. an enterprise server containing a data base having a plurality of data objects each representing a physical data base table;
   b. a mass storage system having a first access time and a memory having a second access time wherein said second access time is faster than said first access time;
   c. a version property associated with one of said plurality of data objects;
   d. a terminal having a session which generates a request under control of one of said plurality of said users involving access to said one of said plurality of data objects and permit manipulation of said data;

e. a version list stored within said memory associated with said session having an assumed version property;

f. comparing means responsively coupled to said data base for comparing said assumed version property with said version property; and g. an update facility which updates said version list from said data base if said comparing means finds said assumed version property does not equal said version property.

2. The apparatus of claim 1 wherein said session further comprises a JavaScript object.

3. The apparatus of claim 2 wherein each of said plurality of data objects has a separate version property associated therewith.

4. The apparatus of claim 3 wherein said terminal is responsively coupled to said enterprise server containing said data base via a publically accessible digital data communication network.

5. The apparatus of claim 4 wherein each of said version properties is stored within said data base.

6. A method of maintaining synchronization of data within a system data base stored within mass storage permitting one user of a plurality of users to utilize a terminal to access and manipulate a plurality of instances of a given dataset object within an enterprise server comprising:

a. storing a version property within a data base containing said dataset object representing a physical data base table;

b. preparing a version list associated with a session containing an assumed version property wherein said version list is stored within a memory which is faster than said mass storage;

c. requesting access to said dataset object from said session;

d. comparing said assumed version property to said version property; and e. updating said version list from said data base if said comparing step determines that said assumed version property is not the same as said version property permitting said one user to access and manipulate said system data base.

7. A method according to claim 6 wherein said user session further comprises a JavaScript object.

8. A method according to claim 7 wherein said version list is stored within a first memory which is faster than a second memory wherein said data base is stored.

9. A method according to claim 8 wherein said requesting step occurs over a publically accessible digital data communication network.

10. A method according to claim 9 wherein said assumed version property is transferred via said publically accessible digital data communication network during said requesting step.

11. An apparatus for providing a user with access to a data processing system for manipulating data stored therein as a data base within mass storage comprising:

a. storing means for storing a dataset and corresponding version property within a data base located within an enterprise server associated with a data base table of said data base;

b. requesting means responsively coupled to said storing means for requesting access to said dataset for said manipulating by said user;

c. maintaining means responsively coupled to said requesting means for maintaining version list containing an assumed version property wherein said maintaining means is a memory which is faster than said mass storage; and d. comparing means responsively coupled to said storing means for comparing said version property with said assumed version property.

12. An apparatus according to claim 11 further comprising updating means responsively coupled to said comparing means for updating said version list if said comparing means finds said version property different from said assumed version property.

13. An apparatus according to claim 12 further comprising a publically accessible digital data communication network which couples said requesting means to said storing means.

14. An apparatus according to claim 13 wherein said storing means further comprises MAPPER data base management system.

15. An apparatus according to claim 14 wherein said requesting means further comprises an industry standard personal computer 16. An apparatus for permitting a user to manipulate a database comprising:

a. an enterprise server containing mass storage containing a data base having a plurality of data objects wherein each of said plurality of data objects is associated with a physical data base table and has a separate version property associated therewith wherein each of said version properties is stored within said data base;

b. a particular version property associated with a particular one of said plurality of data objects;

c. a JavaScript object session responsively coupled to said data base via a publically accessible digital data communication network which generates a request involving access to manipulate said particular one of said plurality of data objects;

d. a version list associated with said session having an assumed version property wherein said version list is stored in a memory which is faster than said mass storage;

e. comparing means responsively coupled to said data base which compares said assumed version property with said particular version property; and f. an update facility which updates said version list from said data base if said comparing means finds said assumed version property does not equal said particular version property.

* * * * *